US009854828B2

(12) United States Patent
Langeland

(10) Patent No.: US 9,854,828 B2
(45) Date of Patent: Jan. 2, 2018

(54) METHOD, SYSTEM AND APPARATUS FOR CREATING 3D-PRINTED EDIBLE OBJECTS

(71) Applicant: William Langeland, Incline Village, NV (US)

(72) Inventor: William Langeland, Incline Village, NV (US)

(*) Notice: Subject to any disclaimer, the term of this patent is extended or adjusted under 35 U.S.C. 154(b) by 16 days.

(21) Appl. No.: 14/500,640

(22) Filed: Sep. 29, 2014

(65) Prior Publication Data

US 2016/0088870 A1    Mar. 31, 2016

(51) Int. Cl.
| B29C 67/00 | (2017.01) |
| A61K 31/05 | (2006.01) |
| A61K 31/352 | (2006.01) |
| A61K 31/353 | (2006.01) |
| A61K 38/28 | (2006.01) |
| A23P 20/20 | (2016.01) |
| B33Y 30/00 | (2015.01) |
| B33Y 50/02 | (2015.01) |
| A23P 30/20 | (2016.01) |
| B29C 64/106 | (2017.01) |

(Continued)

(52) U.S. Cl.
CPC ............ *A23P 20/20* (2016.08); *A23P 30/20* (2016.08); *B29C 64/106* (2017.08); *B29C 64/386* (2017.08); *B33Y 30/00* (2014.12); *B33Y 50/02* (2014.12); *A23P 2020/253* (2016.08)

(58) Field of Classification Search
CPC ............ A23P 2001/089; A23P 1/086; B29C 67/0055; B29C 67/0088; B33Y 30/00
See application file for complete search history.

(56) References Cited

U.S. PATENT DOCUMENTS

| 4,910,661 A | 3/1990 | Barth et al. |
| 6,280,784 B1 | 8/2001 | Yang et al. |

(Continued)

FOREIGN PATENT DOCUMENTS

| AT | 002775 | 4/1999 |
| CN | 1706640 | 12/2005 |

(Continued)

OTHER PUBLICATIONS

Patent Prior Art Research Report No. 114900097; Mailed Aug. 29, 2014.

(Continued)

*Primary Examiner* — Alison L Hindenlang
*Assistant Examiner* — Mohamed K Ahmed Ali
(74) *Attorney, Agent, or Firm* — Rutan & Tucker, LLP

(57) ABSTRACT

According to one embodiment, a system of using a three-dimensional (3D) printer to include a cannabinoid comprising: one or more extruders; one or more processors; and a storage module communicatively coupled to the one or more processors, the storage module comprises logic, upon execution by the one or more processors, that receives particulars of a 3D object; receives particulars of a cannabinoid dosage; and instructs the one or more extruders to print the 3D object based on the particulars of the 3D object and the particulars of the cannabinoid dosage, wherein at least a portion of the printed 3D object contains the type of cannabinoid described in the instructions of the particulars of the cannabinoid dosage, and the printed 3D object is edible is provided.

21 Claims, 9 Drawing Sheets

(51) Int. Cl.
B29C 64/386 (2017.01)
*A23P 20/25* (2016.01)

(56) References Cited

U.S. PATENT DOCUMENTS

| | | |
|---|---|---|
| 6,280,785 B1 | 8/2001 | Yang et al. |
| 2002/0007294 A1 | 1/2002 | Bradbury et al. |
| 2002/0008751 A1 | 1/2002 | Spurgeon et al. |
| 2002/0015728 A1 | 2/2002 | Payumo et al. |
| 2003/0173695 A1 | 9/2003 | Monkhouse et al. |
| 2004/0021757 A1 | 2/2004 | Shastry et al. |
| 2004/0130593 A1 | 7/2004 | Decorte |
| 2004/0219109 A1 | 11/2004 | Hatch |
| 2006/0119628 A1 | 6/2006 | Kofman et al. |
| 2007/0098859 A1 | 5/2007 | Shastry et al. |
| 2007/0259010 A1 | 11/2007 | Yoo et al. |
| 2008/0032011 A1 | 2/2008 | Liniger et al. |
| 2008/0260918 A1 | 10/2008 | Lai et al. |
| 2009/0186121 A1 | 7/2009 | Hutchison et al. |
| 2010/0310728 A1* | 12/2010 | van Lengerich ....... A21D 2/165 426/94 |
| 2011/0025735 A1 | 2/2011 | Nohilly et al. |
| 2012/0075391 A1 | 3/2012 | Tsai |
| 2012/0168985 A1 | 7/2012 | Klaber |
| 2012/0251688 A1 | 10/2012 | Zimmerman et al. |
| 2013/0015596 A1 | 1/2013 | Mozeika et al. |
| 2013/0034633 A1 | 2/2013 | von Hasseln |
| 2013/0041629 A1* | 2/2013 | Fisker ................ B29C 67/0088 703/1 |
| 2013/0193621 A1 | 8/2013 | Daya et al. |
| 2014/0099351 A1 | 4/2014 | Adams et al. |
| 2014/0186427 A1 | 7/2014 | Breitenbach et al. |
| 2014/0234500 A1 | 8/2014 | Mitchell et al. |

FOREIGN PATENT DOCUMENTS

| | | |
|---|---|---|
| CN | 1726899 | 2/2006 |
| CN | 2880494 | 3/2007 |
| CN | 1316954 | 5/2007 |
| CN | 101301107 | 11/2008 |
| CN | 101439584 | 5/2009 |
| CN | 202524992 | 11/2012 |
| CN | 103125540 | 6/2013 |
| CN | 203136994 | 8/2013 |
| CN | 103315371 | 9/2013 |
| CN | 103371200 | 10/2013 |
| CN | 103393543 | 11/2013 |
| CN | 103720021 | 4/2014 |
| CN | 103734216 | 4/2014 |
| CN | 103876263 | 6/2014 |
| CN | 103878980 | 6/2014 |
| CN | 203661901 | 6/2014 |
| CN | 103907662 | 7/2014 |
| CN | 103932367 | 7/2014 |
| CN | 103932368 | 7/2014 |
| CN | 103932369 | 7/2014 |
| CZ | 2007-104 | 8/2008 |
| DE | 19510232 | 10/1996 |
| DE | 2020120009561 | 11/2012 |
| GB | 2367996 | 4/2002 |
| JP | 63-196229 | 8/1988 |
| JP | H 09-302294 | 11/1997 |
| JP | 2002-176933 | 6/2002 |
| JP | 2008-214430 | 9/2008 |
| JP | 2013-132213 | 7/2013 |
| KR | 2001-0055191 | 7/2001 |
| KR | 2002-0057498 | 7/2002 |
| KR | 2003-0057914 | 7/2003 |
| KR | 10-0418829 | 2/2004 |
| KR | 20050094234 | 9/2005 |
| KR | 2011-0094517 | 8/2011 |
| KR | 10-1234041 | 2/2013 |
| KR | 10-2014-003625 | 3/2014 |
| KR | 10-1409499 | 6/2014 |
| NL | 1005725 | 10/1998 |
| TW | 200735793 | 10/2007 |
| WO | WO 00/57717 | 10/2000 |
| WO | WO 2006/102048 | 9/2006 |
| WO | WO 2014/087175 | 6/2014 |

OTHER PUBLICATIONS

"The History of 3D Printing"; http://www.redorbit.com/education/reference_library/general-2/history-of/1112953506/the-history-of-3d-printing/.

"3D printing"; Dec. 10, 2014; http://en.wikipedia.org/wiki/3D_printing.

"Candy the New Consumer Confectionery 3D Printer Get's Ready to Launch on Kickstarter"; Aug. 30, 2014; http://3dprintingindustry.com/2014/08/25/3d-systems-treats-renowned-chef-3d-printed-absinthe-treat-50-course-modernist-meal/.

"Guide to using medical cannabis"; http://www.safeaccessnow.org/using_medical_cannabis.

"Vaporization a Safe and Effectiive" Cannabinoid Delivery System, Study Says; Apr. 27, 2006; http://norml.org/news/2006/04/27/vaporization-a-safe-and-effective-cannabinoid-delivery-system-study-says.

"3D Printed Sugar"; Oct. 11, 2014; http://www.fubiz.net/2014/10/11/3d-printed-sugar/.

"3D Systems Treats Renowned Chef to #D Printed Absinthe Treat in 50 Course Modernist Meal"; Aug. 25, 2014; http://3dprintingindustry.com/2014/08/25/3d-systems-treats-renowned-chef-3d-printed-absinthe-treat-50-course-modernist-meal/.

* cited by examiner

METHOD, SYSTEM AND APPARATUS FOR CREATING 3D-PRINTED EDIBLE OBJECTS

FIELD

Embodiments of the disclosure relate to the manufacture of edible objects using a three-dimensional (3D) printer. More specifically, one embodiment of the disclosure relates to a method of manufacturing a 3D-printed edible object infused with a cannabinoid.

GENERAL BACKGROUND 3D printing, also known as additive manufacturing, is the process of an electronic device using additives to form solid 3D objects based upon a digital model (e.g., a CAD model or other computer code or instructions). Successive layers are formed on a receiving tray or platform such that each layer contributes to the desired 3D shape of the digital model. Previously, 3D printing was very expensive and generally not a feasible way to manufacture goods for commercial sale. However, recent improvements in 3D printing technologies have decreased the cost of 3D printing, making it more affordable to manufacture goods for commercial sale using 3D printing technologies. In addition, some 3D printers are even being manufactured and commercialized with the intent to market directly to an average consumer for personalized home-use.

3D printing has permeated numerous technology fields including engineering, aerospace, architecture and medical fields. This technology presents those working in such fields with the ability to model and prototype 3D objects that previously were only viewed in two-dimensions. Although 3D printing can provide detailed models and prototypes of complex 3D objects, the technology to print complex 3D edible substances is at an infancy. Today, edible substances created by a 3D printer generally consist of successive layers of a semi-solid substance or of sugar-based crystals. For example, cookies or brownies may be created using a 3D printer. In addition, 3D-printed food products targeted at geriatric diets consisting of semi-solid materials have also been made available (e.g., puréed foods). As 3D edible printing is at its infancy, social benefits that edible 3D printing can provide have gone unnoticed.

For instance, as is known, most people have experienced a medical issue that requires the consumption of one or more medications. Many patients dislike the taste of medications and find them unappealing. In particular, due to one or more medical conditions, many patients have heightened gag-reflexes or are unable to ingest or digest these medications. Currently, technology has not been used to manufacture various forms of edibles that are visually appealing and more palatable for these patients. Rather, for placement of any medications and/or cannabinoids into an edible product, people had to rely on conventional culinary techniques, which are problematic for a number of reasons.

First, conventional culinary techniques are imprecise, as they are subject to human error. For instance, an imprecise measurement may cause the edible object to be less effective than desired (lower than desired dosage of medication and/or cannabinoid) or even life-threatening where the true dosage greatly exceeds the desired dosage). Second, unlike 3D printing, the shape and complexity of the edible objects are substantially limited when using conventional culinary techniques. For a child undergoing chemotherapy and feeling nauseous, a mechanism that ensures proper medication and/or cannabinoid dosages in edible objects that are visually interesting to that child would be an invaluable product and service in his or her cancer treatment.

Finally, the fact that current edible products containing medications and/or a cannabinoid may bear a close visual resemblance to traditional food items, medical personal administering medications and/or consumers may easily misinterpret a medicated and/or infused edible product for a traditional food item. Technology has not yet been used to clarify which edible objects contain a medication and/or a cannabinoid along with the particulars of the medication and/or cannabinoid contained within the edible object.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
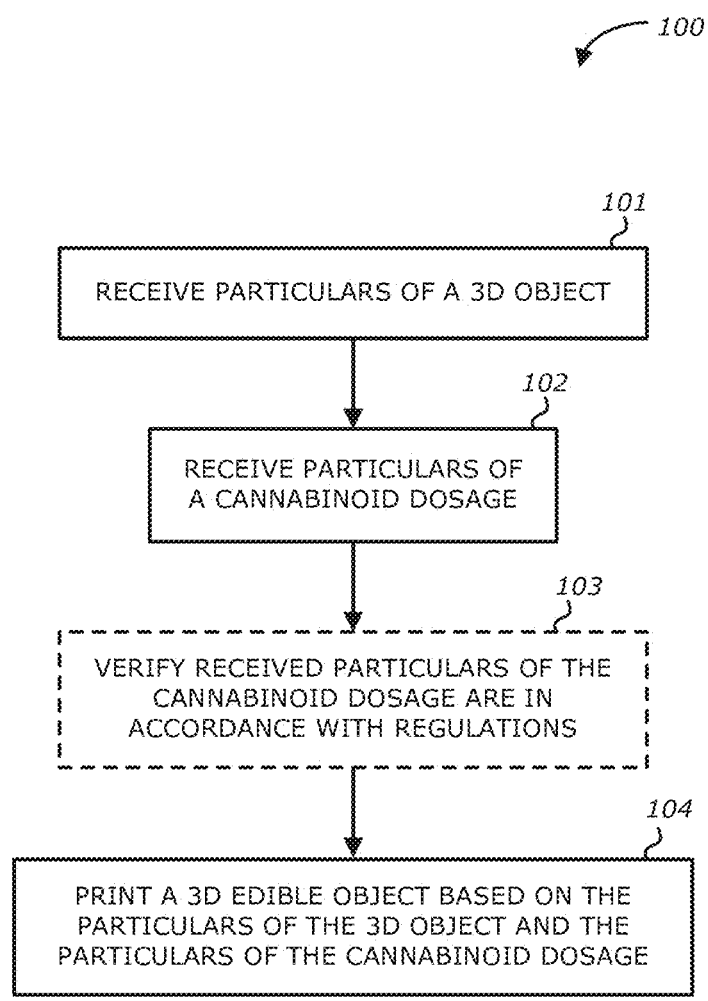
FIG. 1 is a flowchart of an exemplary method for using a three-dimensional (3D) printer to manufacture a 3D-printed edible object infused with a cannabinoid.

Various embodiments of the disclosure relate to a method and system of, and apparatus for, manufacturing a three-dimensional (3D) printed edible object infused with a cannabinoid. The method and apparatus may provide a 3D-printed edible object infused with a cannabinoid and/or a medication to consumers and/or medical patients that is visually appealing having a unique and complex shape. In addition, the 3D-printed edible object may be manufactured to be more palatable due to the ability to print an object resembling any 3D-design having a variety of different tastes. For example, a 3D-printed edible object may take the shape of a dinosaur and taste like a hot dog therefore appeal to children. This may encourage a younger patient at a hospital to consume the 3D-printed edible object infused with a cannabinoid and/or a medication thereby increasing the likelihood that the child will ingest his or her medication.

Additionally, the 3D-printed edible object may include a 3D-printed, edible labeling that may include, among others, the name (e.g., strain) and dosage of the cannabinoid and/or medication, ingestion instructions, cooking instructions and/or expected effect of consuming the 3D-printed edible object.

I. Terminology

In the following description, certain terminology is used to describe features of the invention. For example, logic may be software in the form of one or more software modules, such as executable code in the form of an executable application or one or more instructions. These software modules may be stored in any type of a suitable non-transitory storage medium. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The term "particular" should be interpreted as a characteristic of received input data. Examples of particulars include, but are not limited or restricted to, an amount of cannabinoid to be infused into a 3D-printed edible object, the number of 3D edible objects to print, the timing for printing the 3D edible object(s), the shape of the 3D edible object, the size of the 3D edible object, the color(s) of the 3D edible object, instructions for printing the 3D edible object (timing and movement of extruders along the x-axis, y-axis and z-axis) and/or details of one or more prescription medications to incorporate with the infusion of the cannabinoid.

The term "cannabinoid" should be interpreted as any chemical compound within the class of chemical compounds that act on cannabinoid receptors. Examples of cannabinoids include, but are not limited or restricted to, cannabigerol (CBG), cannabichromene (CBC), cannabicyclol (CBL), cannabivarin (CBV), delta-9-tetrahydrocannabinol (THC), tetrahydrocannabivarin (THCV), cannabidivarin (CBDV), cannabichromevarin (CBCV), cannabigerovarin (CBGV) and cannabigerol monomethyl ether (CBGM). The ingestion of some cannabinoids may produce psychoactive effects for the consumer (e.g., THC) while the consumption of others may not produce psychoactive effects (e.g., CBG).

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for printing one or more 3D edible objects infused with a cannabinoid and/or a medication. As this invention is susceptible to embodiments of many different forms, it is intended that the present disclosure be considered as an example of the principles of the invention and not intended to limit the invention to the specific embodiments shown and described.

II. 3D Printing System for Edible Substances Infused with a Cannabinoid

Referring to FIG. 1, a flowchart of an exemplary method for using a three-dimensional (3D) printer to manufacture a 3D-printed edible object infused with a cannabinoid is shown. Each block illustrated in FIG. 1 represents an operation performed in the method of using a 3D printer to manufacture a 3D-printed edible object infused with a cannabinoid. In operation 101, particulars of a 3D object are received. Examples of particulars of a 3D object may include, but are not limited or restricted to, at least one of a shape of the 3D object, a size of the 3D object, one or more colors, ingestion instructions, cooking instructions or an image to be included on the 3D-printed edible object. In addition, the shape of the 3D object may be any imaginable 3D object including, but not limited or restricted to, recognizable characters (e.g., Barney®, Superman®, etc.), geometric objects (e.g., circle, octagon, hexagon, decagon, etc.), mechanical objects (e.g., car, truck, boat, etc.), animals (dog, cat, etc.), etc.

In addition, the particulars of the 3D object may include printing instructions that comprise specific x-coordinates, y-coordinates, and/or z-coordinates for each of the extruders (to be discussed below) throughout the printing process. For example. The printing instructions may specify that a first extruder distributing a first edible substance is to be at a first x-coordinate, y-coordinate, and/or z-coordinate. Such a location may be represented as "(x-axis, y-axis, z-axis)," or "(x, y, z)," where the variables 'x', 'y' and 'z' may be replaced by numerical values corresponding to a measurement system relative to a predetermined location. For example, the notation "(3, 8, 5)" may represent that, from the predetermined location of the center of the edible substance receiving tray (to be discussed below), a first extruder should position itself at: 3 inches from the predetermined location in the positive direction along the x-axis; 8 inches from the predetermined location in the positive direction along the y-axis; and 5 inches from the predetermined location in the positive direction along the z-axis.

Furthermore, the printing instructions may also include the timing at which the one or more extruders should remain at a given (x, y, z) location. For instance, the instructions may direct the first extruder to remain at location (3, 8, 5) for 10 seconds while distributing a first edible substance. The positioning of the extruders particular x-coordinates, y-coordinates, and/or z-coordinates at specified timings allows the 3D printer system to print a 3D edible object in a specified shape.

In operation 102, particulars of a cannabinoid dosage are received. Examples of particulars of a dosage of a cannabinoid may include, but are not limited or restricted to, at least one of an amount of the cannabinoid dosage (e.g., 10 mg or "4 oz of peanut butter infused with THC"), a type of cannabinoid, one or more warnings (e.g., "Ingesting this edible may cause drowsiness, do not operate a vehicle or heavy machinery."), ingestion instructions ("This edible should be taken on an empty stomach for best results.") and/or cooking instructions ("To obtain the best results, bake the edible at a temperature of 350 degrees Fahrenheit for 15 minutes."). The amount of the cannabinoid dosage may be based on an expected overall weight of the final 3D-printed edible object. For example, if the expected overall weight of the final 3D-printed edible object is to be 16 ounces (oz.) and a serving size is 8 oz., the 3D-printed edible object may have a dosage defined as "5 mg per serving" or "5 mg per 8 oz." In addition, the particulars of the cannabinoid dosage may include details for incorporating a prescription medication with the infusion of a cannabinoid. For example, the particulars of the cannabinoid dosage may include details (e.g., amount, heating instructions, etc.) for incorporating a prescription medication used for treating epilepsy, such as carbamazepine, along the infusion of a cannabinoid. The 3D-printed edible object may be sold to hospitals, or directly to consumers, to treat epilepsy.

It should be noted that the order of receiving the particulars of the 3D object and the particulars of the cannabinoid dosage is not significant and may be reversed without having an adverse affect on the invention.

In optional operation 103, the received particulars of the cannabinoid dosage are verified to ensure the received particulars of the cannabinoid dosage are in accordance with one or more regulations. The verification process may analyze the received particulars of the cannabinoid dosage and compare one or more aspects of the particulars to one or more regulations. Examples of such regulations include, but are not limited or restricted to, state regulations, federal regulations, county regulations or corporate manufacturing regulations. For instance, each state within the United States may set forth its own regulations governing the amount of cannabinoid that may be included in each item sold. Therefore, the verification process illustrated in optional operation 103 may include of a comparison the regulations of a given state to one or more aspects of the received particulars of the cannabinoid dosage. If the aspects of the received particulars of the cannabinoid dosage satisfy the given state regulations, for example, the 3D printer may be allowed to proceed. However, if the one or more aspects of the received particulars of the cannabinoid dosage do not satisfy the given state regulations, the 3D printer may not be allowed to proceed until new particulars of the cannabinoid dosage that satisfy the given state regulations are received.

In addition, the regulations may include regulations for one or more dosages of prescription medications. For example, the 3D-printed edible object may be intended for sale to a hospital for medical use. In one instance, the hospital may administer chemotherapy and subsequently administer treatment through the use of 3D-printed edible objects infused with a cannabinoid to ease nausea through the inclusion of CBD. In one embodiment, the 3D-printed edible object may be, for example, a cookie shaped as a dinosaur infused with CBD that will be given to children under going, or feeling side effects from, chemotherapy. In particular, the prescription may require that each 3D-printed edible object (e.g., each cookie) contains an amount of cannabinoid within a predetermined range (e.g., 10 mg-100 mg) where such a range may be set by restrictions of, among others, (i) prescription requirements set by a physician or other medical professional, or (ii) mandates set by a governmental agency such as the U.S. Food and Drug Administration (FDA).

Finally, in operation 104, a 3D edible object based on the received particulars of the 3D object and the received particulars of the cannabinoid dosage is printed. The printing consists of the extrusion of one or more edible substances and the extrusion of one or more cannabinoids at x-coordinates, y-coordinates and z-coordinates at predetermined timings as discussed above and to be detailed below.

In addition to potentially comprising any shape, size, color and/or taste, the 3D-printed object may have dissolve in a liquid, such as water, based on the edible substances used in the printing process. For example, the 3D-printed edible object may be dropped in a glass of water and the 3D-printed edible object may dissolve as the water dissolves the chemical bonds keeping the printed edible substances together.

Figure 2:
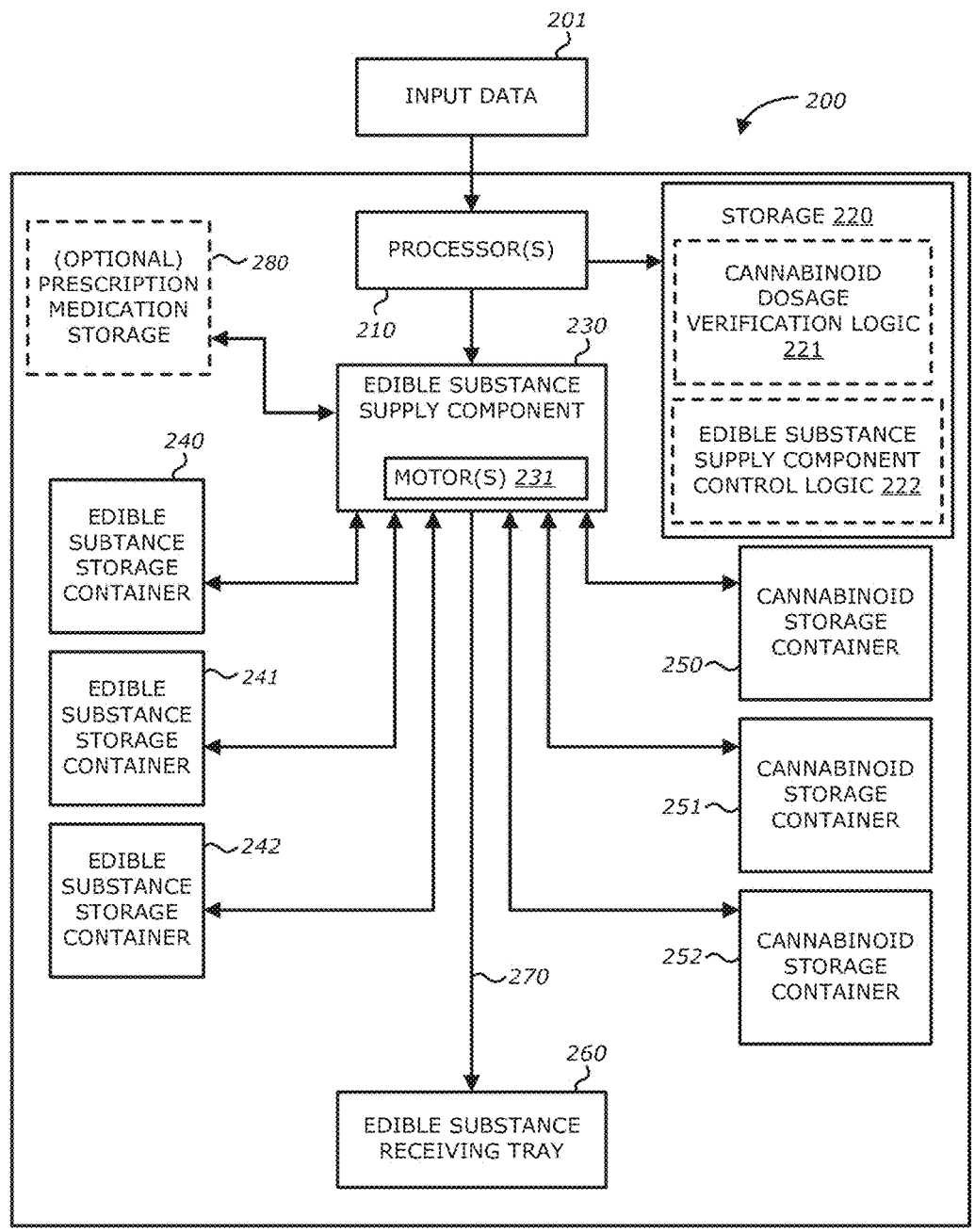
FIG. 2 is a block diagram of an exemplary 3D printing system configured to include a cannabinoid in the printing of the edible object.

Referring to FIG. 2, a block diagram of an exemplary 3D printing system 200 configured to include a cannabinoid in the printing of the edible object is shown. The input data 201 provides information to the 3D-printed edible object system 200 from one or more sources. For example, input data 201, or a portion thereof, may be input manually by an administrator or operator of the 3D-printed edible system 200. Alternatively, or in addition, input data 201, or a portion thereof, may be input via a computer system (not shown). For example, the input from a computer system may be a digital model comprised of computer code such as a computer-aided design (CAD) model. The digital model may be, for example, information from a digital scan of a human's face. The input data 201 may include the particulars of a 3D object and/or the particulars of a cannabinoid dosage, as discussed with FIG. 1. In addition, the input data 201 may include instructions regarding the printing of a 3D edible object, the number of objects to print (e.g., number of objects in a batch of objects), and/or the time for printing the one or more objects.

The 3D printing system 200 includes one or more processors 210, a storage 220 that includes a (i) cannabinoid dosage verification logic 221, and (ii) an edible substance supply component control logic 222, an edible substance supply component 230 that includes one or more motors 231, one or more edible substance storage containers (the edible substance storage containers 240-242), one or more cannabinoid storage containers (the cannabinoid storage containers 250-252), an optional prescription medication storage 280, an edible substance receiving tray 260 and a supply line 270. The storage 220 may be persistent or non-persistent storage.

The input data 201 may include government regulations or requirements concerning cannabinoids and may be modified and/or updated in a quick and efficient manner via software updates received by the cannabinoid dosage verification logic 221. For example, a state law or regulation may change in a state in which a manufacturing plant is located. In such an instance, the cannabinoid dosage verification logic 221 would need to be updated as quickly as possible to ensure the 3D-printed edible objects are being made in accordance with state laws and regulations. Enabling quick updating of the cannabinoid dosage verification logic 221 ensures efficient manufacturing of 3D-printed edible objects that satisfy one or more laws and regulations. Alternatively, or in addition to, it may be desirable that the printing of 3D-edibles infused with a cannabinoid conform to one or more mandates or regulations set forth by the FDA.

The 3D printing system 200 receives the input data 201. The one or more processors 210 are configured to execute logic (e.g., the cannabinoid dosage verification logic 221 and/or the edible substance supply component control logic 222) that may communicate with the storage 220 and the edible substance supply component 230. The logic may place the received input data 201 into the storage 220. In particular, the edible substance supply component control logic 222 parses the input data 201 to obtain printing instructions that, as discussed above, may contain location and timing instructions for one or more extruders. The execution of the edible substance supply component control logic 222 may provide electronic signals to one or more extruders via the edible substance supply component 230, thus providing power to the one or more extruders at the timings specified in the input data 201. In addition, the execution of the edible substance supply component control logic 222 may provide electronic signals to the one or more motors of the 3D printing system 200 thus supplying power and allowing the extruders to obtain the proper positioning. The one or more motors are illustrated as being a component of the edible substance supply component 230. The execution of the edible substance supply component control logic 222 by the one or more processors also provides control over accessing the edible substance storage containers 240-242.

The edible substance supply component 230 includes one or more motors 230 that operate the one or more extruders based on received instructions (e.g., electric signals) as a result of the execution of the edible substance supply component control logic 222. The edible substance supply component 230 may comprise the housing unit to which the base of the one or more extruders connects allowing the edible substance supply component 230 to access the edible substance storage containers 240-242 and the cannabinoid storage containers 250-252 via the one or more extruders.

Examples of instructions included in the input data 201 include, but are not limited or restricted to, begin printing, pause printing, stop printing, which edible substances to use, which cannabinoid(s) to use, the x-coordinates, y-coordinates and z-coordinates to which the one or more extruders (to be discussed below) need to move during printing and the timing at which the one or more extruders need to move. In addition, if the one or more extruders comprise a heating element or a fan, the instructions may include directions regarding at which point in the printing process the heating element and/or the fan should be activated and to what intensity.

The edible substance storage containers 240-242 store the one or more edible substances (e.g., edible substances not including a cannabinoid) used in printing the 3D-printed edible object. The edible substances that may be stored in the edible substance storage containers 240-242 encompass many edible substances that may be in liquid form, semi-solid form (e.g., a puréed state) and/or solid-form. In some instances, the edible substance stored in solid form may need to be transformed into a liquid or semi-solid state prior to utilization in the printing process. Examples of edible substances include, but are not limited or restricted to, chocolate, peanut butter, sugar, jellies, butter, oil, water, cookie dough, brownie batter and/or puréed foods such as fruits, mixed vegetables, chicken and/or steak. For example, the edible substance storage container 240 may store blocks of chocolate that should be heated until the chocolate reaches a predetermined temperature (e.g., 45 degrees Celsius) prior to being obtained by one or more supply lines (e.g., the supply line 270). As mentioned below, a heating component for heating one or more of the edible substance stored in one or more of the edible substance storage containers 240-242 may be included in the 3D-printing system 200 (not shown). In addition, each edible substance storage container 240-242 may store the same or different edible substances.

The cannabinoid storage containers 250-252 store one or more types of cannabinoids that are to be included in the printing process. Any cannabinoid may be stored in any of the cannabinoid storage containers 250-252. For example, the cannabinoid storage containers 250 and/or 251 may store a substance infused with THC while the cannabinoid storage container 252 may store a substance infused with CBD. In such a situation, the 3D printing system 200 may utilize the substance contained within the cannabinoid storage containers 250 and 251 during the printing of 3D edible objects for recreational use so that the 3D-printed edible objects produce a psychoactive effect on the consumer. In addition, the 3D printing system 200 may utilize the substance contained within the cannabinoid storage container 252 during the printing of 3D edible objects for a more limited medical use (e.g., as a treatment for Dravet syndrome, or epilepsy, as discussed above).

In addition, the one or more cannabinoids may be stored in a variety of forms including, but not limited or restricted to, a pre-mixed substance such as chocolate infused with a cannabinoid, a liquid substance such as butter or oil infused with a cannabinoid, a semi-solid substance such as peanut butter infused with a cannabinoid and/or a one or more blocks of a solid substance that is to be heated prior to entering the supply line 270. For example, 24 oz. of peanut butter may be stored in the cannabinoid storage container 250. The peanut butter may have been infused with a cannabinoid, e.g., in the form of a hash oil obtained from a cannabis plant, prior to storage in the cannabinoid storage container 250. Alternatively, the hash oil may be stored in the cannabinoid storage container 250 while 24 oz. of peanut butter is stored in the edible substance storage container 240 and is infused with the hash oil immediately prior to extrusion as the two edible substances are being accessed by an extruder.

The prescription medication storage 280 may store a prescription medication for incorporation with the infusion of the cannabinoid in the 3D-printed edible object. For example, the prescription medication storage 280 may store a prescription medication to treat severe headaches, pain and/or nausea associated with chemotherapy or cancer-related treatments (e.g., codeine or OxyContin).

The supply line 270 includes one or more supply lines that distribute one or more edible substances and/or one or more cannabinoids in accordance with instructions received by the 3D-printing system 200 and parsed by the edible substance supply component control logic 222. The one or more supply lines may include, among others, one or more extruders (as mentioned above) and/or one or more feed tubes. An extruder may comprise a flexible tube portion, a nozzle component, one or more motors, a fan and/or a heating element. The flexible tube portion may accept an edible substance and/or a cannabinoid and transport the edible substance and/or the cannabinoid to the edible substance receiving tray 260. A feed tube may comprise a hollow tube configured to, for example, fill a portion of a printed 3D edible object with an edible substance or place a predetermined amount of an edible substance and/or a cannabinoid-infused substance on the edible substance receiving tray 260 (e.g., a base of a complex edible structure).

The nozzle component may regulate the flow of the edible substance and/or the cannabinoid as it is extruded from the extruder onto the edible substance receiving tray 260 in accordance with the instructions received by the edible substance supply component 230. The fan and heating component may each be turned on and off at various times during the printing process and at varying intensities in order to cool or heat, respectively, a particular edible substance, a cannabinoid-infused substance and/or a particular portion of the printed 3D edible object.

Figure 5:
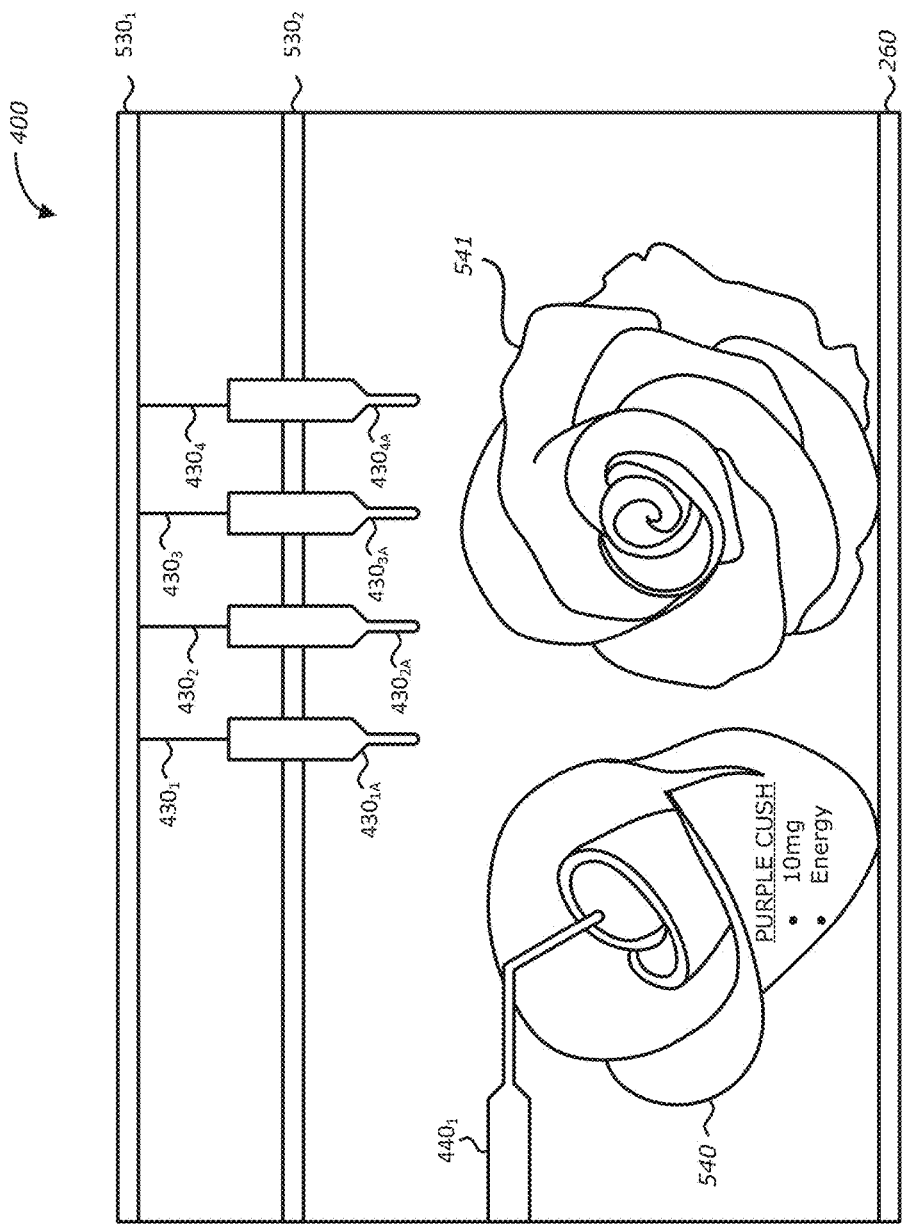
FIG. 5 is an illustration of an exemplary perspective of the 3D printing system of FIG. 4.
Figure 9:
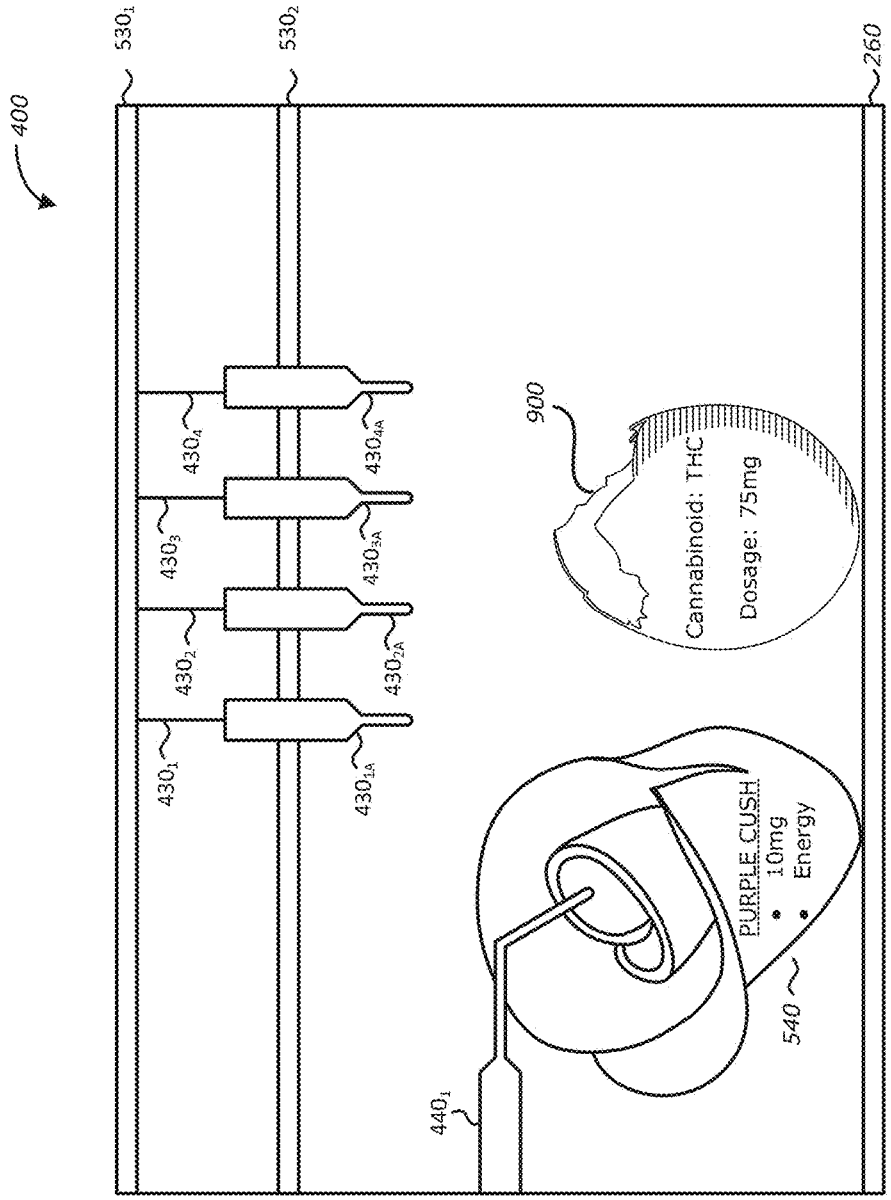
FIG. 9 is an exemplary embodiment of an exoskeleton of a 3D-printed edible object containing a label printed with a 3D printing system.
Figure 10:
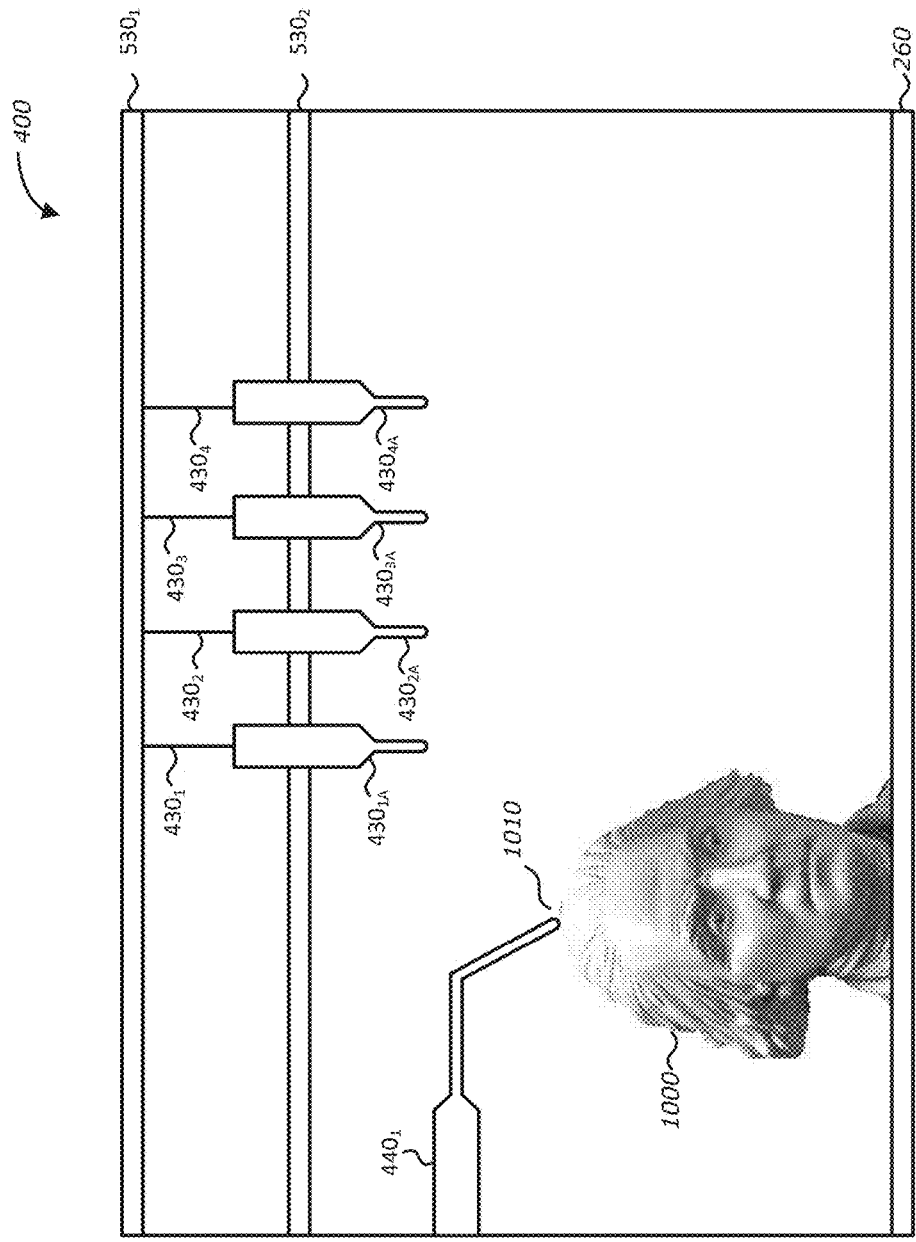
FIG. 10 is a second exemplary embodiment of an exoskeleton of a 3D-printed edible object containing a label printed with a 3D printing system.

In addition, the one or more extruders and/or feed tubes may be connected to one or more cross beams positioned above the edible substance receiving tray 260 and configured to move along the one or more cross beams (as seen in FIGS. 5, 9 and 10). The cross beams may provide the one or more extruders and/or the one or more feed tubes support to move, powered by a motor, in a direction in the x-coordinate, the y-coordinate, the z-coordinate or any combination thereof.

III. 3D Printing System for Edible Exoskeleton

Figure 3:
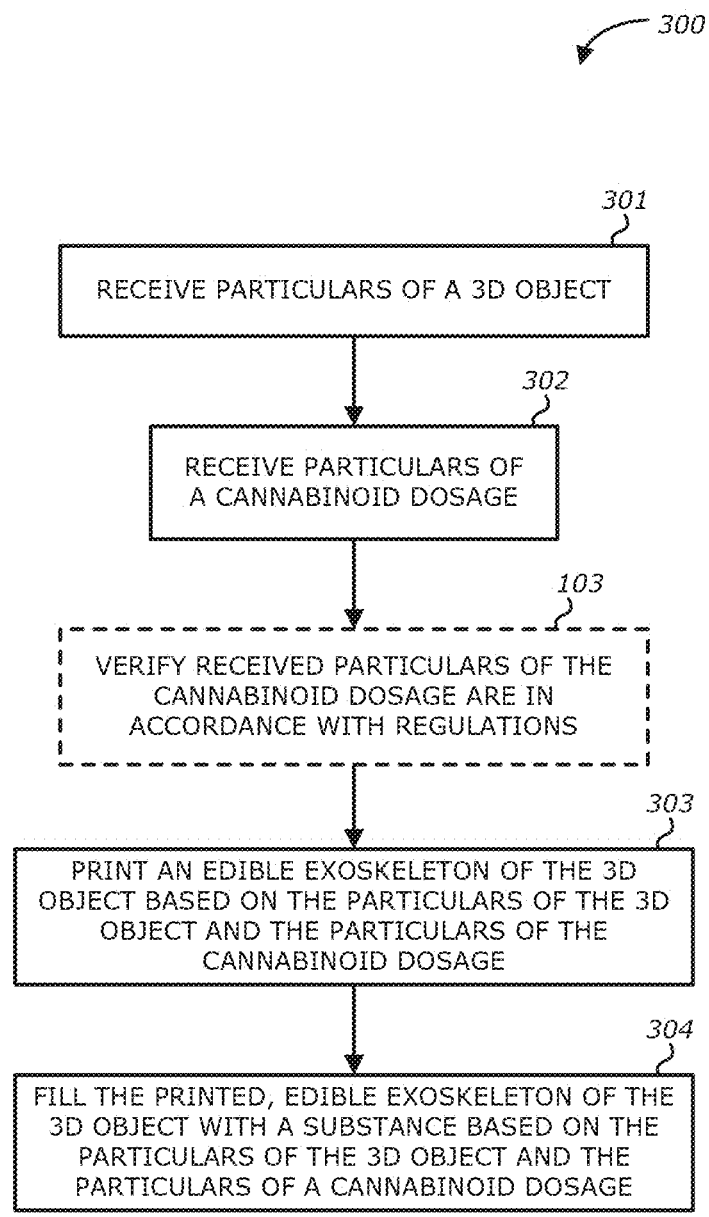
FIG. 3 is a flowchart of a second exemplary method for using a 3D printer to manufacture a 3D-printed edible object infused with a cannabinoid.

Referring to FIG. 3, a flowchart of a second exemplary method for using a 3D printer to manufacture a 3D-printed edible object infused with a cannabinoid is shown. In operation 301, particulars of a 3D object are received. The particulars of a 3D object of operation 301 are similar, and may include, the particulars of a 3D object received in operation 101 of FIG. 1. Additionally, the particulars received in operation 301 may include directions for printing an exoskeleton of the 3D object and/or directions for filling the exoskeleton where the exoskeleton is a hollow rendition of the 3D object. For example, directions regarding the printing of an exoskeleton may include the thickness of the exterior of the exoskeleton. Examples of directions for filling the exoskeleton may include, but are not limited or restricted to, heating instructions of the filling material, the rate at which the exoskeleton may be filled (e.g., for stability and structural integrity purposes) and/or the type of filling material.

In operation 302, particulars of a cannabinoid dosage are received. The particulars of a cannabinoid dosage of operation 302 are similar to, and may include, the particulars of a cannabinoid dosage received in operation 102 of FIG. 1. Additionally, the particulars received in operation 302 may include directions for filling the exoskeleton as discussed above and/or directions for the use of an edible substance infused with a cannabinoid as at least a portion of the exoskeleton.

In general, three embodiments are of particular interest: (1) the exoskeleton is printed with one or more edible substances infused with a cannabinoid and the one or more filling materials are not infused with a cannabinoid; (2) the exoskeleton is printed with one or more edible substances infused with a cannabinoid and the filling material is also infused with a cannabinoid; and (3) the exoskeleton is printed with one or more edible substances not infused with a cannabinoid and the one or more filling materials are infused with a cannabinoid.

The particulars received in operation 301 and/or operation 302 may provide information regarding the materials of the exoskeleton and the filling material in order for the edible substance supply component 410 and/or the cannabinoid infusion component 420 (to be discussed below) to control the supply lines 430 and 440 (of FIG. 4) to print the desired 3D edible object.

In operation 303, an exoskeleton of a 3D edible object based on the received particulars of the 3D object and the received particulars of the cannabinoid dosage is printed. In operation 304, the printed exoskeleton of the 3D edible object is filled with a substance based on the received particulars of the 3D object and the received particulars of the cannabinoid dosage. The filling substance may be any edible substance stored in the edible substance storage containers 240-242 and/or the cannabinoid storage containers 250-252 as discussed above.

Figure 4:
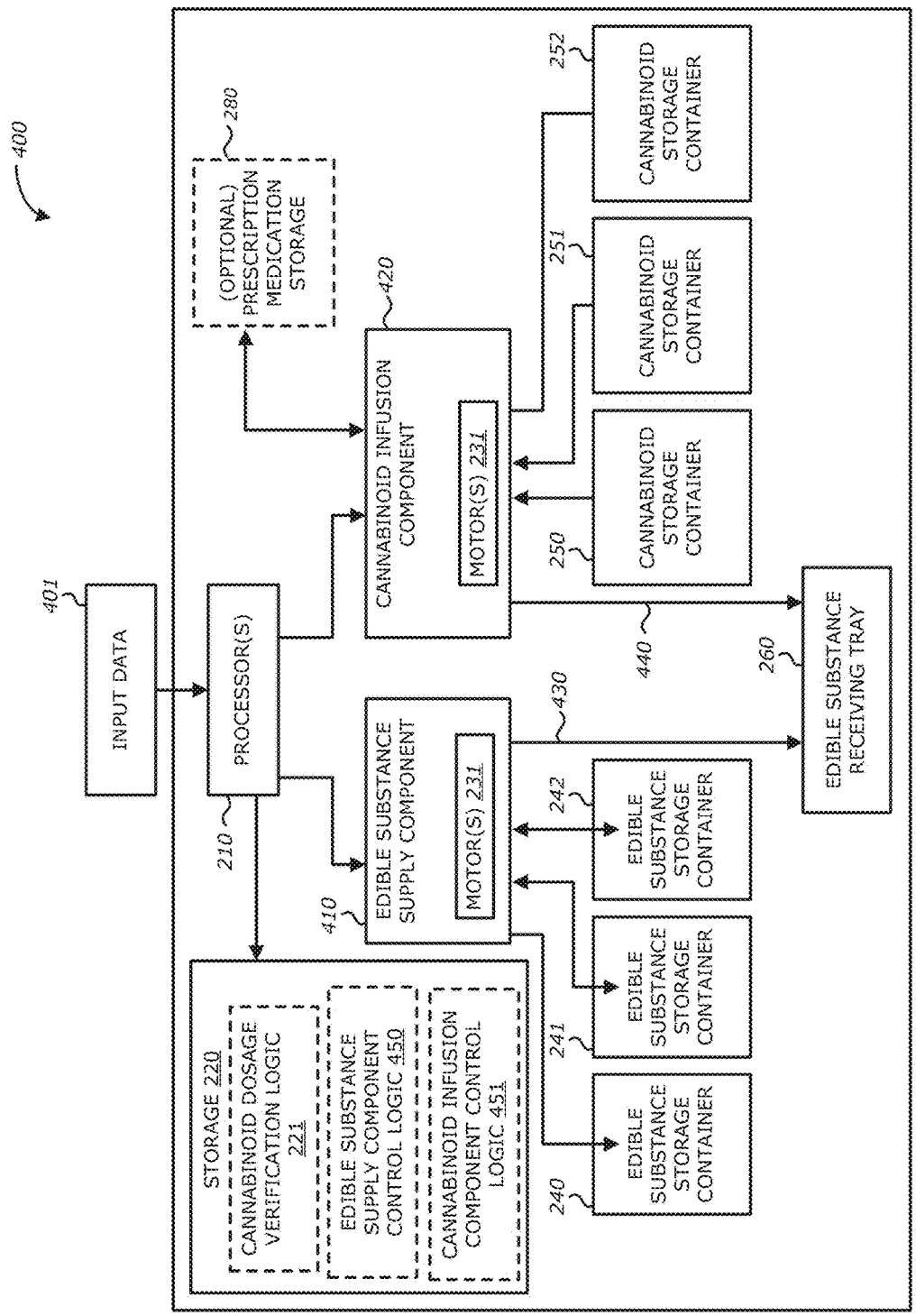
FIG. 4 is a block diagram of a second exemplary 3D printing system configured to include a cannabinoid in the printing of the edible object.

Referring to FIG. 4, a block diagram of a second exemplary 3D printing system configured to include a cannabinoid in the printing of the edible object is shown. The input data 401 provides information to the 3D printing system 400 from one or more sources that is similar to the information provided by the input data 201 of FIG. 2. The input data 401 may include the particulars of a 3D object and/or the particulars of a cannabinoid dosage, as discussed with FIG. 1. In addition, the input data 401 may include instructions regarding the printing of the 3D edible object, the number of objects to print (e.g., number of objects in a batch of objects), and/or the time for printing the one or more objects.

The exemplary 3D printing system 400 includes one or more processors 210, an edible substance supply component 410 that includes the motors 231, a cannabinoid infusion component 420 that includes the motors 231 and a storage 220 that includes (i) an edible substance supply component control logic 450, and (ii) a cannabinoid infusion component control logic 451. The edible substance supply component control logic 450 and the cannabinoid infusion component control logic 451 receive the input data 401 and parse the data to obtain the corresponding printing instructions (e.g., the cannabinoid infusion component logic 451 parses the input data 401 to obtain the printing instructions corresponding to the printing of any substance stored in the cannabinoid storage containers 250-252 or the prescription medication storage 280). Similar to the discussion above regarding the edible substance supply component control logic 222, the edible substance supply component control logic 450 and the edible cannabinoid infusion component control logic 451 supply instructions in the form of electric signals to the supply lines 430 and 440 respectively.

Similarly to the edible substance supply component 230 of FIG. 2, the edible substance supply component 410 receives instructions from edible substance supply component control logic 450, when the edible substance supply component control logic 450 is executed by the one or more processors 210, where the instructions may include, but are not limited or restricted to, begin printing, pauseprinting, stop printing, which edible substances to use, the x-coordinates, y-coordinates and z-coordinates to which the one or more extruders (to be discussed below) need to move during printing and the timing at which the one or more extruders need to move. The edible substance supply component 410 may access the edible substance storage containers 240-242 and place the edible substances on the edible substance receiving tray 260 via the supply line 430.

Similarly to the edible substance supply component 410, the cannabinoid infusion component 420 receives instructions in the form of electric signals from the cannabinoid infusion component control logic 451, when the cannabinoid infusion component control logic 451 is executed by the one or more processors 210. The instructions may include, but are not limited or restricted to, begin printing, pause printing, stop printing, which one or more cannabinoids to use, the x-coordinates, y-coordinates and z-coordinates to which the one or more extruders (to be discussed below) need to move during printing and the timing at which the one or more extruders need to move. The cannabinoid infusion component 420 may access the cannabinoid storage containers 250-252 and place the one or more cannabinoids on the edible substance receiving tray 260 via the supply line 440.

The supply line 430 includes one or more supply lines that distribute one or more edible substances in accordance with instructions received by the edible substance supply component 410. The supply line 440 includes one or more supply lines that distribute one or more cannabinoids in accordance with instructions received by the cannabinoid infusion component 420. The one or more supply lines may include, among others, one or more extruders and/or one or more feed tubes as discussed above. The edible substance supply component 410 interprets the instructions received from the processor 210 and directs the supply line 430 to access one or more of the edible substance storage containers 240-242. The cannabinoid infusion component 420 receives electric signals received as a result of the execution of the cannabinoid infusion component control logic 451 by the one or more processors 210 and directs the supply line 440 to access one or more of the cannabinoid storage containers 250-252.

Referring to FIG. 5, an illustration of an exemplary perspective of the 3D printing system 400 of FIG. 4 is shown. The exemplary perspective illustrates two 3D-printed edible objects, objects 540 and 541, in the shape of flowers sitting on the edible substance receiving tray 260. In addition, the cross beams $530_1$ and $530_2$ are seen to support the supply lines $430_1$-$430_4$ that include the extruders $430_{1A}$-$430_{4A}$ attached to the edible substance supply component 410. The supply line $440_1$ is illustrated as being configured to fill a 3D-printed edible object (e.g., object 540) with a cannabinoid-infused substance.

In one embodiment, the objects 540 and 541 may be exoskeletons of desired 3D objects (e.g., flowers) printed by the 3D printing system 400 using a chocolate material not infused with a cannabinoid stored in one or more of the edible substance storage containers 240-242. The objects 540 and 541, being hollow exoskeletons, may then be filled with a cannabinoid-infused substance, for example, a cannabinoid-infused peanut butter or cannabinoid-infused caramel, stored in one or more of the cannabinoid storage containers 250-252.

The object 540 is illustrated as including a 3D-printed labeling that describes a strain of a cannabinoid (e.g., a strain of THC—shown as "Purple Cush"), an amount of the cannabinoid dosage (seen as "10 mg") and expected effects (seen as "Energy").

In some embodiments, the 3D-printed edible objects 540 and/or 541 may include one or more edible substances that should be cooked (e.g., baked, fried, microwaved, etc.) prior to consuming. For example, a 3D-printed brownie may include at least a portion of a raw egg. Therefore, it would be recommended that the 3D-printed brownie be baked prior to consumption. Additionally, such cooking instructions, or warnings regarding consuming raw materials, may be printed on the 3D-printed edible object.

IV. 3D Printing System Including Labeling on Printed Edibles

Figure 6A:
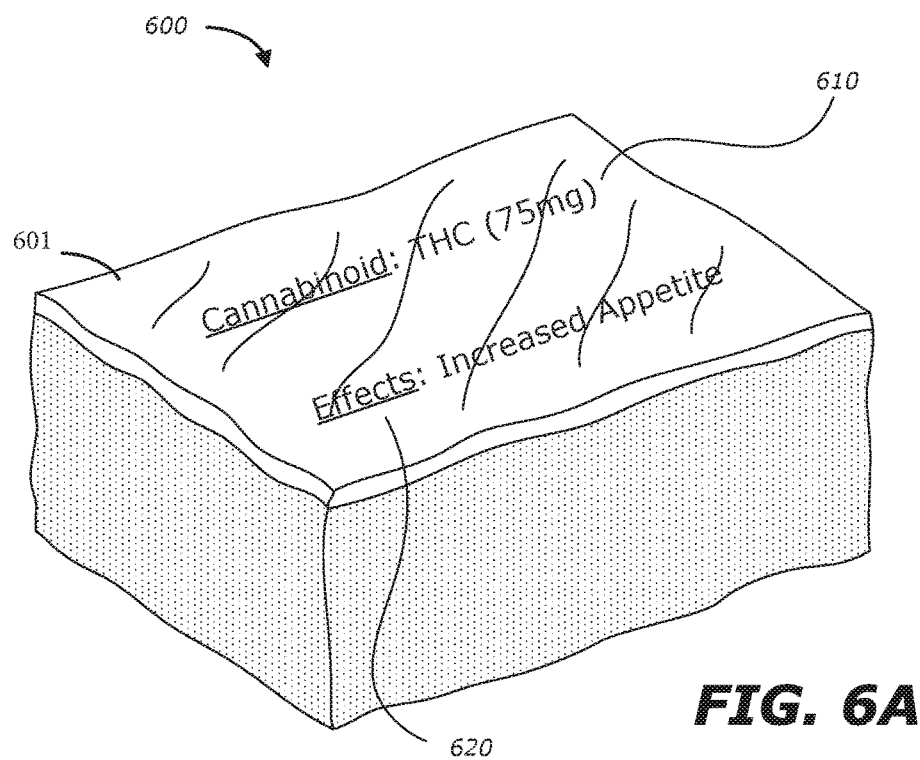
FIG. 6A is an exemplary embodiment of a 3D-printed edible object containing a label printed with a 3D printing system.

In some embodiments, a 3D printing system may include the option of printing, among others, labels, ingestion instructions and/or one or more pictures on a 3D-printed edible object. Referring to FIG. 6A, an exemplary embodiment of a 3D-printed edible object 600 containing a label printed with a 3D printing system is shown. The 3D-printed edible object 600 is illustrated as, for example, a brownie 600. The 3D-printed brownie 600 includes a printed design on its top portion 601. The design may be any picture or graphic. For example, the design may be a picture of a recognizable cartoon character, a celebrity, the logo of a sports team, a pet, a loved one or a mechanical design such as a space ship or robot. Alternatively, or in addition, the design may include the date and time at which the 3D-printed edible object should be consumed to help with administering medications as well as the specific cannabinoid infused in the 3D-printed edible object and the expected effect of the cannabinoid. In such an embodiment, the design would be included in the input data received by the 3D printing system (e.g., the input data 201 of FIG. 2) or stored in a storage of the 3D printing system (e.g., the storage 220 of the 3D printing system 200).

The brownie 600 also includes the labels 610 and 620. The label 610 describes the type and amount of cannabinoid present in the brownie 600, THC and 75 mg, respectively. The label 620 is a description of the effect consuming the brownie 600 is likely to have on the consumer. The exemplary embodiment illustrates that consumption of the brownie 600 may result in an increased appetite. Therefore, this will allow a medical patient to distinguish between which 3D-printed edible objects (e.g., brownies) include a cannabinoid and/or a prescription medication, the amount of the cannabinoid and/or prescription medication and/or the expected effects.

Figure 6B:
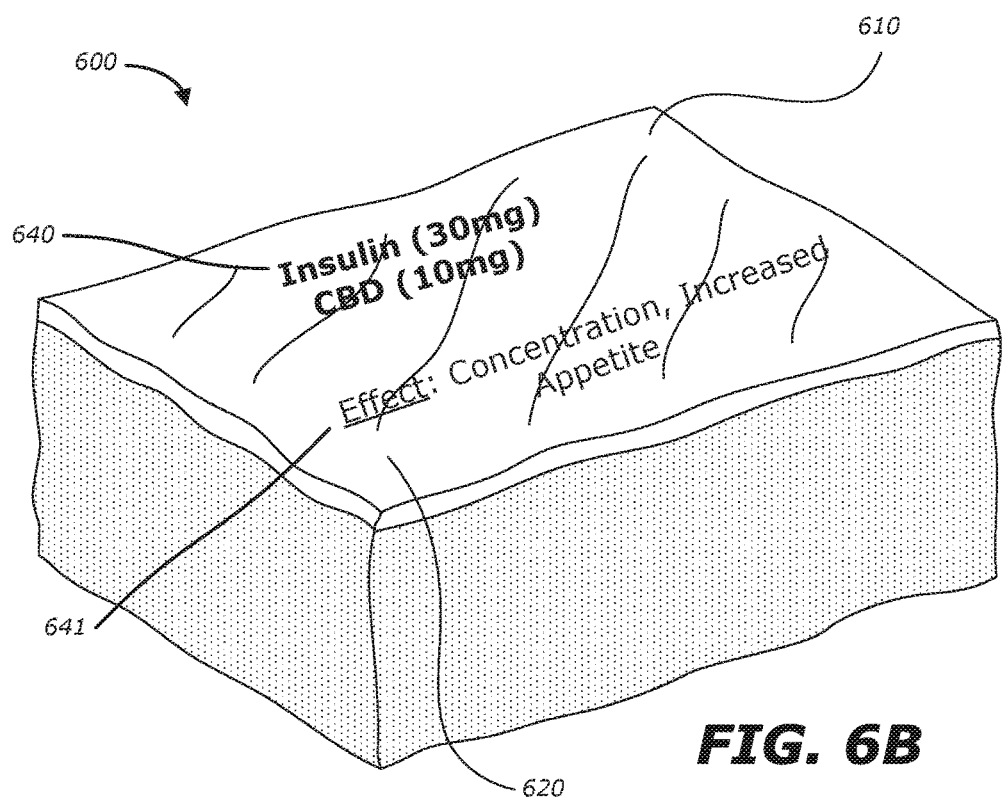
FIG. 6B is a second exemplary embodiment of a 3D-printed edible object containing a label printed with a 3D printing system.

Referring to FIG. 6B, a second exemplary embodiment of a 3D-printed edible object 630 containing a label printed with a 3D printing system is shown. The 3D-printed edible object 630 is illustrated as, for example, a brownie 630. The brownie 630 includes the labels 640 and 641. The label 640 details that the brownie 630 includes both a prescription medication (30 mg of insulin) and a cannabinoid (10 mg of CBD). The label 641 is a description of the effects consuming the brownie 630 is likely to have on the consumer. The exemplary embodiment illustrates that consumption of the brownie 630 may result in an better concentration and an increased appetite. Therefore, this will allow a medical patient to distinguish between which 3D-printed edible objects (e.g., brownies) include a cannabinoid and/or a prescription medication, the amount of the cannabinoid and/or prescription medication and/or the expected effects.

Figure 7:
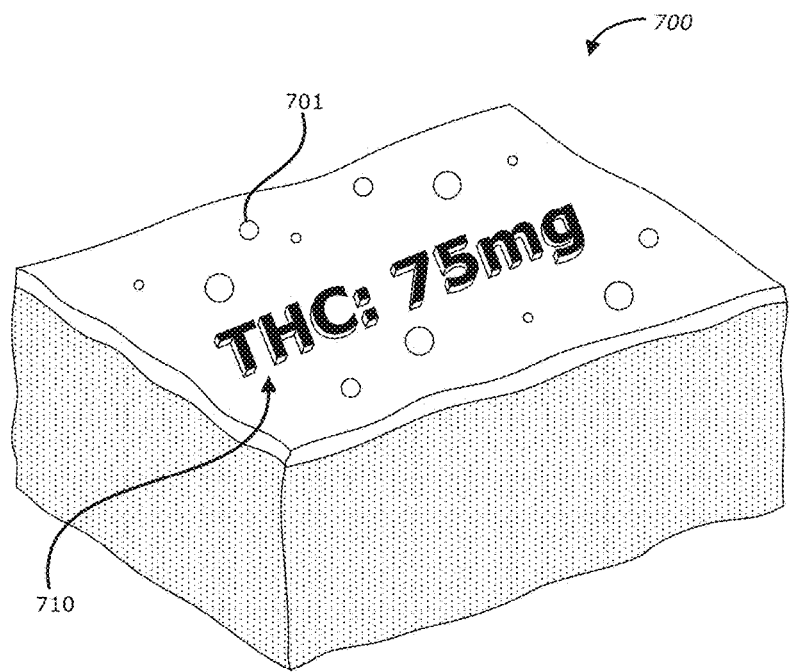
FIG. 7 is a second exemplary embodiment of a 3D-printed edible object containing a label printed with a 3D printing system.
Figure 8:
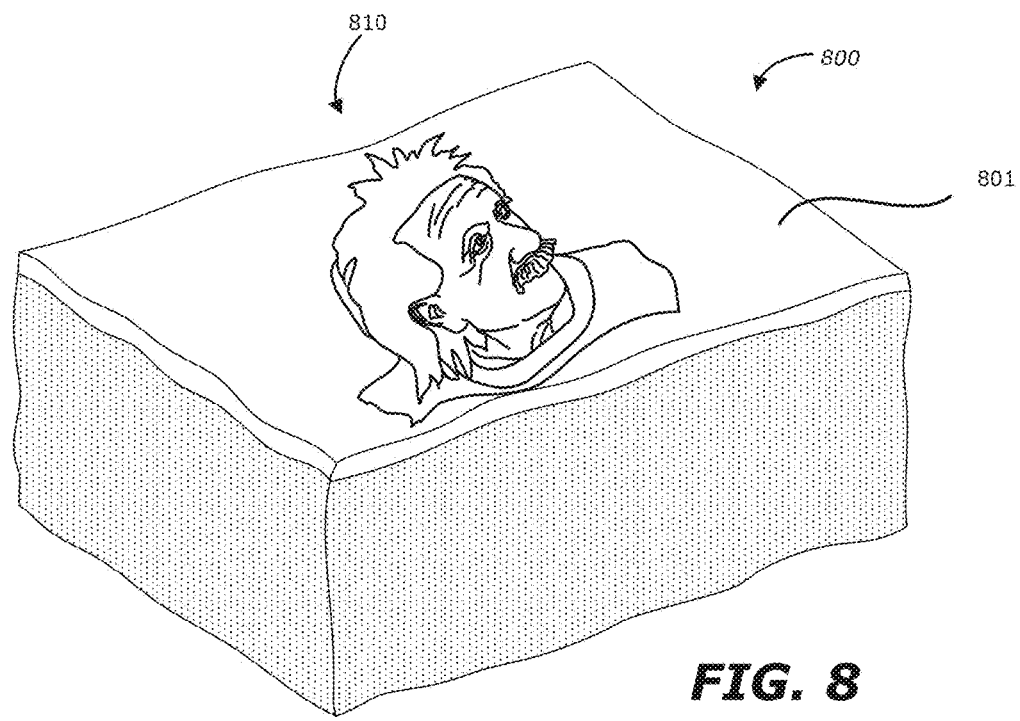
FIG. 8 is a third exemplary embodiment of a 3D-printed edible object containing a label printed with a 3D printing system.

Referring to FIG. 7, a second exemplary embodiment of a 3D-printed edible object containing a label printed with a 3D printing system is shown. The brownie 700, as with the brownie 600, may be any edible object printed by the 3D printing system. The brownie 700 is decorated with a bubble-like design on its top portion 701 and a 3D label 710 describing the type and amount of cannabinoid present in the brownie 700. Referring to FIG. 8, a third exemplary embodiment of a 3D-printed edible object containing a label printed with a 3D printing system is shown. As an exemplary embodiment, the brownie 800 includes a design 810 on the top portion 801. The design 810 may have been included in the input data received by the 3D printing system, or stored in the storage 220 and is illustrated as the face of Albert Einstein.

It should be noted that the 3D-printed edible object does not have to be infused with a cannabinoid. The 3D-printed label may be infused with a cannabinoid and affixed to the 3D-printed edible object. In another embodiment, the 3D-printed label infused with a cannabinoid may be affixed to an edible object created by traditional baking or cooking means. In yet another embodiment, the 3D-printed label may not be infused with a cannabinoid but may be affixed to a 3D-printed edible object that was infused with a cannabinoid during printing.

Referring to FIG. 9, an exemplary embodiment of an exoskeleton of a 3D-printed edible object containing a label printed with a 3D printing system is shown. The 3D-printed edible object 900 ("the egg 900") is an illustration of the 3D printing system 400 printing an exoskeleton. The egg 900 is a hollow exoskeleton that may be filled with an edible substance. As discussed above, the filling material may be filled with an edible substance infused with a cannabinoid. Alternatively, the filling material may be filled with a traditional edible substance not infused with a cannabinoid (e.g., peanut butter). The filling material may be a in a liquid form (e.g., cannabinoid-infused liquor), a semi-sold form (e.g., cannabinoid-infused peanut butter or caramel), or a solid form (e.g., cannabinoid-infused chocolate chips).

Referring to FIG. 10, a second exemplary embodiment of an exoskeleton of a 3D-printed edible object containing a label printed with a 3D printing system is shown. The 3D-printed edible object 1000 is an illustration of a 3D-printed edible object being filled with a filling material 1010 by the supply line 440₁ of the 3D printing system 400. The 3D-printed edible object 1000 is illustrated as the head of George Washington. As discussed above, the filling material 1010 may be infused with a cannabinoid or may be a traditional substance not infused with a cannabinoid.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system for printing a three-dimensional (3D) object including a cannabinoid, the system comprising:
   one or more extruders;
   a storage module; and
   one or more processors communicatively coupled to the storage module, the one or more processors to access and execute logic within the storage module, the logic programmed to, upon execution by the one or more processors, perform operations including:
   receiving a first input including one or more regulations, wherein the one or more regulations is one or more of: a state regulation, a federal regulation, a county regulation, a corporate manufacturing regulation, or a federal agency regulation,
   receiving particulars of the 3D object that include instructions describing at least (i) a shape of the 3D object, (ii) a size of the 3D object, and (iii) at least a first edible substance to be used in printing the 3D object,
   receiving particulars of a cannabinoid dosage that include instructions describing at least (i) a type of cannabinoid to be used in printing the 3D object and (ii) a dosage amount of the type of cannabinoid,
   verifying the dosage amount of the type of cannabinoid is less than or equal to a value set forth in the one or more regulations that restricts the dosage amount of the type of cannabinoid that may be used in printing of the 3D object, wherein information associated with the one or more regulations is stored in the storage module, and
   responsive to verifying the dosage amount, instructing the one or more extruders to print the 3D object based on the particulars of the 3D object and the particulars of the cannabinoid dosage,
   wherein at least a portion of the printed 3D object contains the type of cannabinoid described in the instructions of the particulars of the cannabinoid dosage, and
   the printed 3D object is edible.

2. The system of claim 1, wherein the dosage amount of the type of cannabinoid comprises a dosage range, the dosage range including a first predetermined threshold and a second predetermined threshold, the second predetermined threshold being greater than the first predetermined threshold.

3. The system of claim 1, wherein the type of cannabinoid is delta-9-tetrahydrocannabinol (THC).

4. The system of claim 3, wherein the particulars of a cannabinoid dosage include instructions for incorporating insulin into the printing of the 3D object.

5. The system of claim 1, wherein the particulars of a cannabinoid dosage include a type of prescription medication.

6. The system of claim 1, wherein the one or more processors to access and execute information within the storage module to further perform operations including:
   instructing the one or more extruders to print text onto the printed 3D object, the text disclosing an expected effect of the type of cannabinoid onto the printed 3D object, the expected effect of the type of cannabinoid being included in the particulars of the cannabinoid dosage.

7. The system of claim 1, wherein the particulars of the 3D object further include at least one or more colors or an ingestion instruction.

8. The system of claim 1, wherein the particulars of the cannabinoid dosage further include at least one of one or more warnings or an ingestion instruction.

9. The system of claim 8 wherein the one or more processors to access and execute the logic within the storage module to further perform operations including:
   instructing the one or more extruders to print a dosage of the cannabinoid onto the printed 3D object.

10. The system of claim 1 further comprising:
    one or more motors communicatively coupled to the processor,
    wherein the instructing the one or more extruders to print the 3D object includes providing electric signals to the one or more motors that move a first extruder of the one or more extruders to a specified location based on a coordinate system according to a specified timing.

11. A system for printing a three-dimensional (3D) object including a cannabinoid, the system comprising:
    one or more extruders;
    a storage module; and
    one or more processors communicatively coupled to the storage module, the one or more processors to access and execute logic within the storage module, the logic programmed to, upon execution by the one or more processors, perform operations including:
    receiving a first input including one or more regulations, wherein the one or more regulations is one or more of: a state regulation, a federal regulation, a county regulation, a corporate manufacturing regulation, or a federal agency regulation,
    receiving particulars of the 3D object that include instructions describing at least (i) a shape of a 3D exoskeleton of the 3D object, (ii) a size of the 3D object, and (iii) at least a first edible substance to be used in printing the 3D object,
    receiving particulars of a cannabinoid dosage that include instructions describing at least (i) a type of cannabinoid to be used in printing the 3D object and (ii) a dosage amount of the type of cannabinoid,
    verifying the dosage amount of the type of cannabinoid is in accordance with less than or equal to a value set forth in the one or more regulations that restricts the dosage amount of the type of cannabinoid that may be used in printing of the 3D object, wherein information associated with the one or more regulations is stored in the storage module,
    responsive to verifying the dosage amount, instructing the one or more extruders to print the 3D exoskeleton of the 3D object based on the particulars of the 3D object and the particulars of the cannabinoid dosage, and
    responsive to verifying the dosage amount, instructing the one or more extruders to fill the 3D exoskeleton of the 3D object with a filling substance based on the particulars of the 3D object and the particulars of the cannabinoid dosage, wherein at least a portion of at least one of (i) the printed 3D exoskeleton of the 3D object or (ii) the filling substance contains the type of cannabinoid described in the particulars of the cannabinoid dosage, and the printed 3D object is edible.

12. The system of claim 11 wherein, the instructions describing at least a 3D exoskeleton include at least one of (i) a thickness of an exterior of the 3D exoskeleton, (ii) the filling substance to fill the 3D exoskeleton, or (iii) a rate at which the 3D exoskeleton may be filled with the filling substance.

13. An apparatus for printing three-dimensional (3D) edible objects infused with a cannabinoid, the apparatus comprising:
   a receiving tray;
   one or more extruders;
   a storage module for storing (i) an edible substance supply component control logic, and (ii) a cannabinoid infusion logic, (iii) a cannabinoid dosage verification logic; and
   one or more processors communicatively coupled to the storage module and the extruders, the one or more processors to access and execute,
   (i) the edible substance supply component control logic programmed for
      receiving a first input including one or more regulations, wherein the one or more regulations is one or more of: a state regulation, a federal regulation, a county regulation, a corporate manufacturing regulation, or a federal agency regulation,
      receiving particulars of a 3D object that include instructions describing at least (1) a shape of a 3D exoskeleton of the 3D object, (2) a size of the 3D object, and (3) at least a first edible substance to be used in printing the 3D object, and
      instructing a first extruder of the one or more extruders to print the 3D object by depositing an amount of the first edible substance on the receiving tray based on the particulars of the 3D object,
   (ii) the cannabinoid infusion control logic programmed for
      receiving particulars of a cannabinoid dosage that include instructions describing at least (1) a first type of cannabinoid to be used in printing the 3D object and (2) a dosage amount of the type of cannabinoid; and
      instructing a second extruder of the one or more extruders to print the 3D object by depositing an amount of a first cannabinoid substance of the first type of cannabinoid on the receiving tray based on the particulars of the cannabinoid dosage, and
   (iii) the cannabinoid dosage verification logic programmed for
      verifying the dosage amount of the type of cannabinoid is less than or equal a value set forth in the one or more regulations that restricts the dosage amount of the type of cannabinoid that may be used in printing of the 3D object, wherein information associated with the one or more regulations is stored in the storage module, and wherein (i) instructing the first extruder of the one or more extruders to print the 3D object and (ii) instructing the second extruder of the one or more extruders to print the 3D object by depositing the amount of a first cannabinoid substance are done in response to verifying the dosage amount,
   wherein the printed 3D object is edible.

14. The apparatus of claim 13, wherein the particulars of the cannabinoid dosage include instructions for incorporating a prescription medication into the printing of the 3D object by accessing a prescription medication storage with the second extruder of the one or more extruders and depositing an amount of the prescription medication on the receiving tray.

15. The apparatus of claim 14, wherein the prescription medication is insulin.

16. The apparatus of claim 13, wherein the instructing the first extruder of the one or more extruders to print the 3D object by depositing the amount of the first edible substance on the receiving tray includes instructing the first extruder of the one or more extruders to access an edible substance storage container for storing the first edible substance which does not include a cannabinoid.

17. The apparatus of claim 13 wherein the instructing the second extruder of the one or more extruders to print the 3D object by depositing the amount of the first cannabinoid substance on the receiving tray includes instructing the second extruder of the one or more extruders to access a cannabinoid storage container for storing the first cannabinoid substance.

18. The apparatus of claim 13 further comprising:
   a first motor communicatively connected to the one or more processors, mechanically connected to the first extruder and controlled by the edible substance supply component logic through one or more electric signals, operation of the first motor to allow the first extruder to move to a first location.

19. The apparatus of claim 18, wherein the first location is determined by a set of coordinates, the coordinates included in the particulars of a 3D object.

20. The system of claim 1, further comprising:
   instructing the one or more extruders to print 3D text onto the printed 3D object, wherein the 3D text includes an expected effect of the type of cannabinoid, the expected effect being included in the particulars of the cannabinoid dosage.

21. The system of claim 11, further comprising:
   instructing the one or more extruders to print 3D text onto the printed 3D object, wherein the 3D text includes one or more ingestion instructions, the one or more ingestion instructions being included in the particulars of the cannabinoid dosage.

* * * * *